July 3, 1962 D. T. MEISENHEIMER ET AL 3,041,742
SELECTIVELY OPERABLE STAR FINDER
Filed June 30, 1959 3 Sheets-Sheet 1
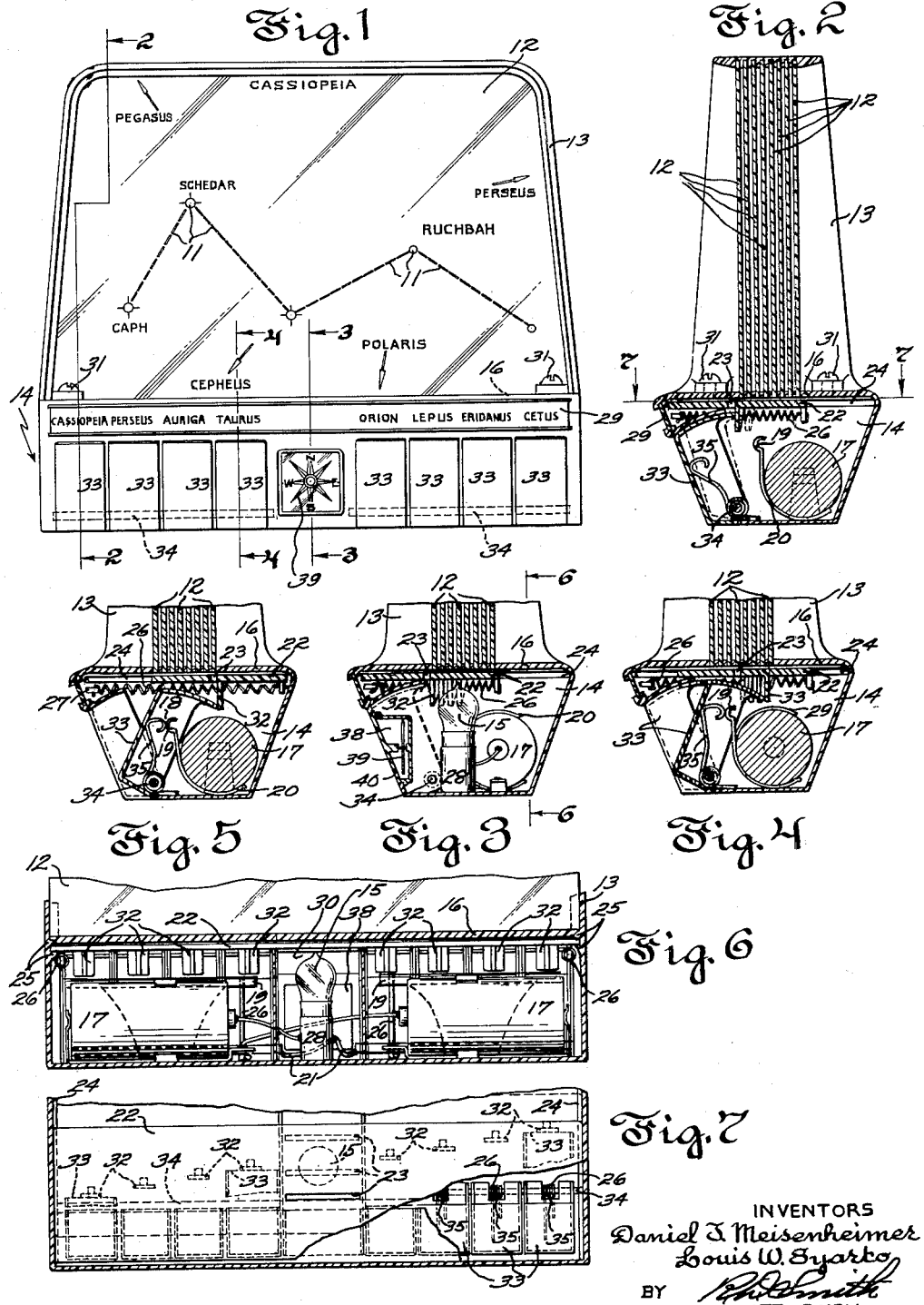
INVENTORS
Daniel T. Meisenheimer
Louis W. Syarto
BY
ATTORNEY

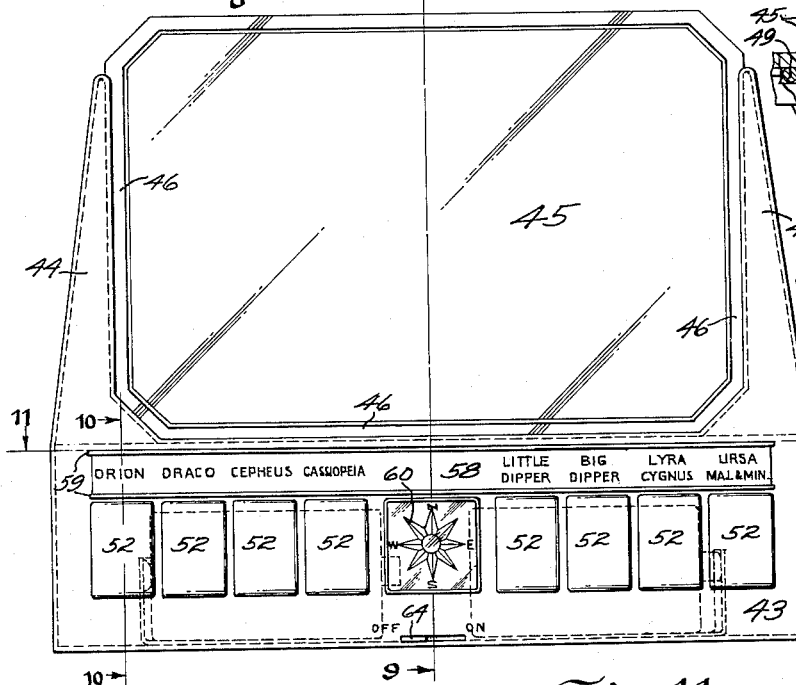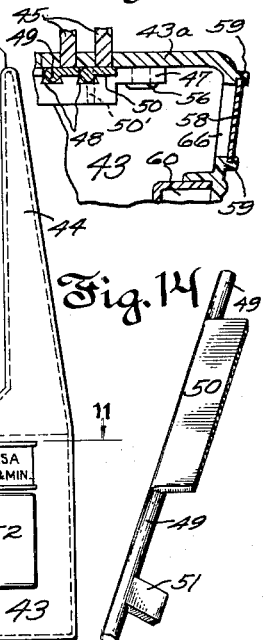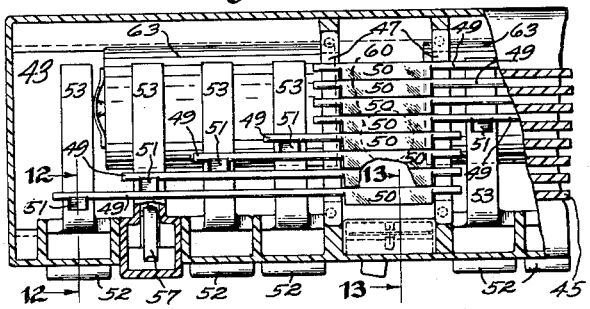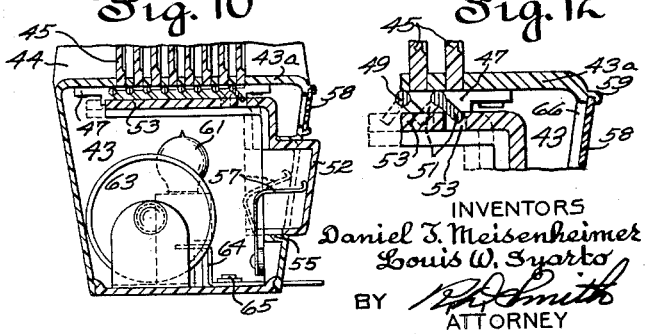

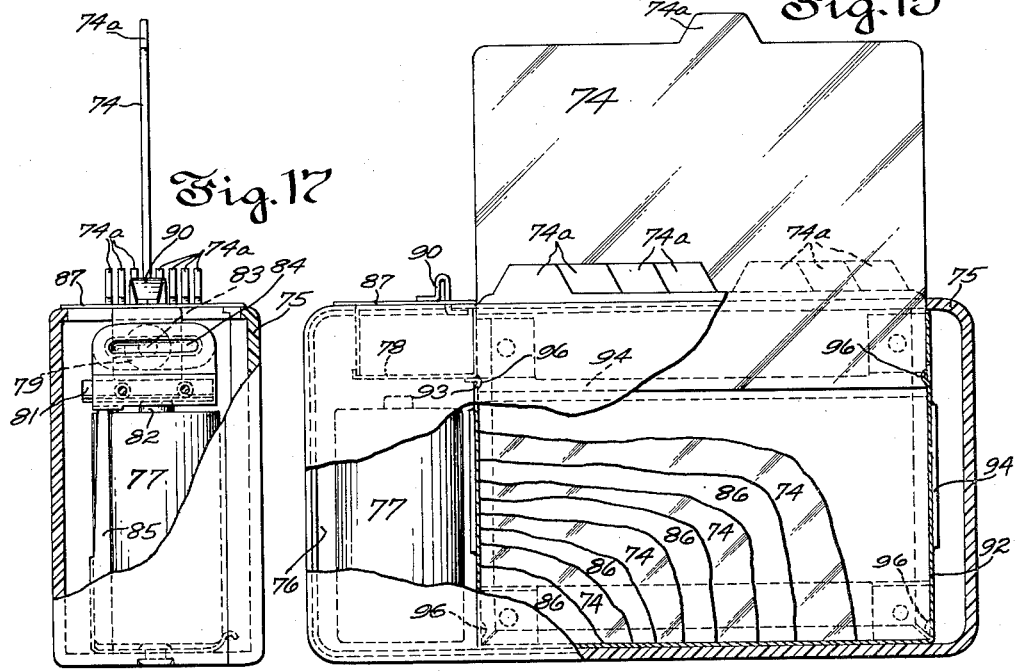

United States Patent Office 3,041,742
Patented July 3, 1962

3,041,742
SELECTIVELY OPERABLE STAR FINDER
Daniel T. Meisenheimer, Milford, and Louis W. Syarto, Fairfield, Conn., assignors to the A. C. Gilbert Company, New Haven, Conn., a corporation of Maryland
Filed June 30, 1959, Ser. No. 824,097
16 Claims. (Cl. 35—43)

This invention relates to an instructional sky scanner for viewing natural constellations of stars and planets at night in a manner to orient and identify their names while looking at them in the sky. The improvements incorporate certain principles of construction and use which characterize simpler forms of sky scanners disclosed in our co-pending patent application, Serial No. 789,680, filed January 28, 1959, now U. S. Patent No. 2,994,971.

The object of the present improvements is to transfer edge lighting from one charted transparent sky viewing plate to a differently charted transparent sky viewing plate by rectilinear motion of the parts which govern the plate illumination, as distinguished from rotary movements of corresponding parts made use of in the forms of sky scanner disclosed in said co-pending application.

Another object is to control edge lighting of the plates by operating a plurality of push buttons which may be pressed individually and selectively to cause edge lighting of any chosen one of a plurality of plates when ganged together so that respectively different diagrams faintly illuminated by light directed at the corresponding plate edge can be rendered visible in the dark.

A further object is to cause edge lighting of any selected viewing plate without edge lighting of any other of the ganged plates as a result of rectilinear movement of certain aperture controlling elements.

Still another object is to shift the source of illumination bodily in a way to transfer edge lighting from one viewing plate to another.

Still another object is to protect a group of ganged viewing plates by a housing covering all of them except the one currently selected for use, such housing being in the nature of a storage file out of which only that plate which is to be used need be withdrawn for edge lighting and display at the time of use.

A still further object is to eliminate dependence on the degree of turning of a control knob for determining which one of a group of closely ganged viewing plates shall be edge lighted, and also to eliminate thereby any necessity for sequential lighting of a plurality of viewing plates in order to effect the ultimate display of a particular desired diagram intended to be used in studying the sky.

These and other objects of the invention will become clear in greater particular from the following description of several embodiments of the improvements, in which description reference is had to the appended drawings wherein:

FIG. 1 is an elevation of the improved sky scanner showing a viewing plate carrying a typical constellation diagram rendered visible by edge lighting.

FIG. 2 is a view taken in section on the planes 2—2 in FIG. 1 looking in the direction of the arrows, showing all viewing plates cut off from the common source of light by a light controlling gate that can be made to illuminate their edges one at a time selectively.

FIG. 3 is a fragmentary view like FIG. 2 taken on the plane 3—3 in FIG. 1, looking in the direction of the arrows, showing the source of illumination in the base chamber and also showing a directional compass illuminated by light derived therefrom.

FIG. 4 is a view taken in section on the plane 4—4 in FIG. 1 looking in the direction of the arrows showing the light governing gate moved a distance toward the right for edge lighting one of the viewing plates.

FIG. 5 is a view taken in section on the plane 2—2 in FIG. 1 looking in the direction of the arrows showing the light governing gate shifted to the limit of its movement toward the right for illuminating a different viewing plate.

FIG. 6 is a view taken partially in section on the plane 6—6 in FIG. 3 looking in the direction of the arrows.

FIG. 7 is a plan view taken in section on the plane 7—7 in FIG. 2 and showing the light governing gate broken away to expose the underlying push buttons.

FIG. 8 is a view in elevation like FIG. 1 showing modified construction of the improved sky scanner differently controlled by push buttons as to edge lighting.

FIG. 9 is a view taken in section on the plane 9—9 in FIG. 8 looking in the direction of the arrows.

FIG. 10 is a fragmentary view taken in section on the plane 10—10 in FIG. 8.

FIG. 11 is a plan view with parts broken away taken partially in section on the plane 11—11 in FIG. 8.

FIG. 12 shows some of the parts of FIG. 10 on an enlarged scale in section on the plane 12—12 in FIG. 11.

FIG. 13 is a fragmentary view similar to FIG. 12 taken in section on the plane 13—13 in FIG. 11.

FIG. 14 is a view in perspective showing one of the light gates removed from the assembly of FIG. 11.

FIG. 15 shows in elevation, with parts partially in section on plane 15—15 in FIG. 16 a still different modification of the improved sky scanner wherein the viewing plates are withdrawably filed in a carrying case and subject to edge lighting when individually withdrawn therefrom, parts being partially broken away.

FIG. 16 is a plan view of the sky scanner of FIG. 16.

FIG. 17 is an endwise view of the same sky scanner with the end wall of the casing partially broken away on the plane 17—17 in FIG. 16.

FIG. 18 is a view taken partially in section on the plane 18—18 in FIG. 19 looking in the direction of the arrows.

FIG. 19 is a fragmentary view taken in section on the plane 19—19 in FIG. 16.

FIG. 20 shows disassembled parts of the magazine that retains the viewing plates removed from the carrying case.

FIG. 1 of the drawings in our aforesaid co-pending application pictures an observer looking at the night sky through an instructional sky scanner of a simpler type than improved forms thereof herein disclosed, but intended in the same manner to be held before the sky at approximately arm's length from the eyes of the user.

The presently improved forms of sky scanner are made use of in a similar manner but can be manipulated by the fingers of the hand of the user while being held toward the sky in a way to render visible a choice of predetermined diagrams that can be made to appear by selective edge lighting of different viewing plates carrying respectively different diagrams, grouped together in a gang.

In FIGS. 1 and 2 a preferred arrangement for a gang of such viewing plates 12 is shown, the condition of illumination being such that no one of the viewing plates is edge lighted. Hence the entire gang of plates acts as a perfectly transparent structure consisting of slightly spaced apart multiple transparent panes carrying no markings that are visible in the darkness of the night. In such condition the scanner can be interposed between the night sky and the eye of the observer without obscuring the visibility of the stars or other celestial bodies in the sky. As is fully explained in our co-pending application, upon the edge lighting of an individual one of the viewing plates there will appear thereon in faint lines of light the diagram of whatever constellation is etched or marked on that particular plate, such diagram being of a size that accords in dimension and proportion with the appearance of some real constellation as viewed through the plate, for instance, the constellation, Cassiopeia, represented in FIG. 1. The diagram markings 11 may comprise embossing on the face of the plate.

The viewing plates may be molded of Lucite, a trademark designating a methacrylate molding compound, and the plate margins are supported removably in parallel grooves in a holding frame 13 that upstands from a base chamber 14 illuminated by an electric light bulb 15. The lower edges of all plates 12 are individually exposed to the interior of the base chamber through spaced apart slots in the top wall of the chamber. All walls of the chamber except where apertured are opaque other than a translucent partition wall that defines a recess 38 containing a compass needle.

Chamber 14 contains two dry cell batteries 17 electrically connected in series to energize a lamp bulb 15 under control of circuit switching means hereinafter referred to. Chamber 14 also contains a sliding gate 22 containing a single light escape aperture 23 therethrough about as wide as the thickness of a single one of the viewing plates. The ends of the gate 22 are slidably supported in grooves 24 formed by frame lugs 25 so that the gate is shiftable between its position in FIG. 2 and its position in FIG. 5. Gate 22 is constantly biased in a forward direction toward its position in FIG. 2 by an extension spring 26 at each end of the gate connecting the gate with frame studs 27.

As a means for sliding the gate 22 selective distances forward and backward, or from left to right in FIGS. 2–5, the gate is equipped with a series of ears 32 depending from and rigid with the gate, which ears are stationed on the gate at graduated distances from the front edge of the gate and spaced lengthwise of the gate so that the ears align respectively in the paths of a series of push buttons 33 whereby each push button can engage and thrust against a different one of the ears 32. All of the push buttons swing about a common pivotal axis provided by two coaxial hinge rods 34 supported at their ends in the upright walls of chamber 14. The push buttons have front faces individually biased into common alignment flush with the front wall of chamber 14 by individual springs 35 so that normally all of the push buttons occupy the position of the push button shown in full lines in FIG. 2. Each push button when pressed inward of compartment 14 travels a constant distance the extent of which is shown in the full line position of push button 33 in FIG. 5.

The aperture 23 in gate 22 can thus be shifted from its normal position in FIGS. 2 and 4 and shown in full lines in FIG. 7, to various displaced positions such as in FIGS. 4 and 5, and shown in broken lines in FIG. 7, for the purpose of permitting light to escape from compartment 14 at a point to direct light at the edge of a different viewing plate 12 depending on which push button 33 is operated. The positions of certain push buttons 33 at the time they first encounter the ear 32 against which they are to act are likewise shown by broken lines in FIG. 7.

Also incorporated in the front wall of base chamber 14 is a recessed pocket 38 in which is pivotally mounted a compass needle 39 made visible through the transparent front wall 40 of the pocket by light entering the pocket through the inner translucent wall of the lighted chamber.

The electrical system in base chamber 14 includes in circuit with the lamp bulb 15 and the series connected batteries 17 the aforesaid switch 18 which comprises two horizontally extending resiliently supported conductive switch contact rails 19 of the same polarity as the base terminal 20 of one of the batteries. Each one of the push button returning springs 35 makes contact individually only with one of the contact rails 19 when the push button has been swung clockwise to its limit position shown in FIG. 5. This causes the lamp bulb to be lighted only when some one of the push buttons is fully pressed inward to illuminate a selected one of the viewing plates 12. The lamp energizing circuit includes permanent leads 21 connecting the lamp socket 28 to each of the push button hinge rods 34. Each spring 35 is constantly in electrical contact with the hinge rod which it encircles.

In operation, the form of sky scanner shown in FIGS. 1–7 is held up before that region in the night sky which the observer desires to study. By means of a translucent name strip 29 carrying the names of different constellations diagramed on the different viewing plates the operator is informed which of the push buttons 33 should be pressed in order to illuminate some particular constellation diagram in which he is interested. The name strip 29 can be slipped endwise into and out of position in front of a horizontally elongated opening 30 in the top portion of the front wall of base chamber 14 through which light from the base chamber can escape and glow through the translucent name strip making the name markings clearly visible in the dark. Strip 29 is easily replaceable by a different name strip when a different set of viewing plates 12 is to be used. For changing the viewing plates the holding frame 13 can be removed from the top wall of the chamber 14 by loosening the holding screws 31.

By the use of push buttons 33 to illuminate a selected viewing plate there is avoided any limitation as to degree of movement that must be imparted to a single turn knob for making such selection, a limitation that characterizes the simpler forms of sky scanner disclosed in our aforesaid copending application. The compass 39 is useful to the observer in orienting the locations of the various constellations in the sky. The swinging of each push button the same full distance causes a different extent of rectilinear movement of light escape aperture 23 in gate 22. This is clear from the showing in FIG. 4 that a full inward swing of the push button captioned "Taurus" has resulted in sliding the gate 22 only half as far toward the right as does an equally full inward swing of the push button captioned "Cassiopeia" because, as is seen from FIG. 7, each push button in order from left to right must traverse a greater proportion of idle swinging movement before it encounters and begins to impel the actuated ear depending from the gate that lies in its path. For example, the push button captioned "Cetus" moves idly through seven-eighths of its full swing before it encounters and impels the corresponding gate ear during the final one-eighth of its swing.

In FIGS. 8 to 14 a modified form of the sky scanner comprises a base chamber 43 somewhat similar to that in FIGS. 1–7 from which there upstands the side racks 44 grooved to receive the margins of viewing plates 45. In one face of each plate there is a shallow recessed panel bordered by the thicker margin 46 of the plate. This slightly sunken panel serves to protect the plate markings from scarring when plates are stacked in mutual contact in handling and storage.

Underlying and extending crosswise of the bottom edges of viewing plates 45 there are stationed two horizontal bearing cleats (47) each cleat being fixed against the bottom surface of the opaque top wall 43a of base chamber 43 as by rivets 56, and having a series of dove-tailed notches 48 facing the under side of the top chamber wall to provide rotary bearing respectively for the trunnion rods 49 of a series of rocking gates 50. Each of these gates is an opaque light baffle swingable from a full line position shown in FIG. 13 to the dotted line position 50' for respectively cutting off and exposing to the light in chamber 43 the bottom edge of each plate individually. Each gate 50 is thus swung between open and closed positions by means of a lug 51 angularly displaced from the gate 50 at an angle of about 45 degrees in a downward pointing direction. The lugs 51 are carried respectively by the rod-like trunnions 49 of the gates in positions that are spaced from left to right in FIGS. 8 and 11 to correspond with the lateral spacing of push buttons 52.

Each push button performs an equal extent of rectilinear travel from its full line position to its broken line position in FIGS. 10 and 12 carrying with it a horizontally projecting bar 53 that contains a narrow aperture 53' with which the lower end of the lug 51 is operably engaged. Movement of any bar from right to left in FIGS. 10 and 12 results from pressing inward on its push button and flips the lug 51 clockwise from full line to broken line position in FIG. 12. This swings the light controlling gate 50 in unison therewith from full line position to broken line position in FIG. 13 and exposes the bottom edge of a single one of the viewing plates to the light in chamber 43. Push buttons 52 are guided for rectilinear motion in slide bearings 55 and are constantly biased by springs 57 toward the front into common alignment projecting outward somewhat from the front wall of base chamber 43.

As in the sky scanner of FIGS. 1 to 7 a name strip 58 of translucent material carries the names of different constellations and is removably lodged in grooved horizontal rails 59 in front of an opening 66 which permits light to escape from chamber 43. Also as in FIGS. 1 to 7 a compass 60 is visible in the dark by light from the interior of the chamber.

In FIGS. 8 to 12 the source of illumination is a lamp bulb 61 held in a socket 62 and switched into and out of circuit with the dry cell batteries 63 by the swinging of a jogged conductive arm 64 into and out of contact with the center terminal of the lamp. The lamp is constantly in series with one pole of the batteries while the arm 64 is supplied with current from an opposite battery pole at its pivot 65 by the usual lead wires or bus straps not shown.

In operating the sky scanner of FIGS. 8 to 14 the push buttons 52 are manipulated as are the push buttons 33 in FIGS. 1 to 7 but there does not occur any edge lighting of any viewing plate other than a single viewing plate that corresponds with the particular push button that is pressed.

FIGURE 15 shows a further modified construction of a sky scanner embodying some of the principles of the invention in which a group of viewing plates 74 are slidably and removably inserted or filed in spaced relation in a carrying case 75. The spaces between the viewing plates are occupied by opaque thin separator partitions 86.

At one end of case 75 there is an auxiliary compartment 76 comparable to the base chambers 14 and 43 containing a dry cell battery 77 and a traveling light cage 78 containing and carrying the lamp bulb 79 supported in an insulated socket 80 and serving as a light baffling gate. The lamp cage 78 is a box of conductive material slidably supported on a casing ledge and which carries depending therefrom a conductive spring strip contact 81 that wipes lengthwise across the center terminal 82 of a dry cell battery 77 while the center terminal 83 of the lamp socket wipes along a stationed conductive bar that is permanently in circuit with the case terminal 85 of the battery.

Light cage 78 contains a vertical slot 89 in its upright opaque light baffling wall adjacent to the vertical side edges of the viewing plates 74 which therefore is shiftable with the cage crosswise the edges of the entire set of viewing plates. The light cage may additionally be supported and slidably shifted by means of a combined handle and pointer 90 that projects through and rides in a slot 90 in the top wall of the auxiliary compartment 76 of the carrying case. Such top wall of compartment 76 includes a translucent panel 87 that carries a list of names of different constellations designating the diagrams on those individual plates that are aligned edgewise with the respective name markings on the panel. The pointer 90 thus aids in selecting any desired constellation diagram that is to be illuminated. Some portion of panel 87 is always exposed to light from lamp bulb 79 if the top wall of the slidable light cage 78 is transparent or translucent so that the markings on the panel are visible in the dark. The handle pointer 90, being opaque appears in silhouette against the dully glowing panel 87.

Casing 75 will preferably be made of strong opaque plastic material. The viewing plates 74 are held in a magazine 92 and their separator spaced edges, where adjacent compartment 76, are exposed to that compartment at a high location within the case above magazine 92. The magazine may be formed from springy sheet material so as to form inward directed spring leaf detents 93 that bear against the side edges of the viewing plates. Each viewing plate has two notches in each of its opposite side edges that are engaged by the detents 93, in one instance to hold a selected viewing plate elevated above the other plates and above the confines of the carrying case, and otherwise normally to retain all of the other viewing plates yieldably within the confines of the case. Magazine 92 is fixed within the case by being secured to a mounting bracket 94 whose offset mounting legs 95 are riveted to the rear wall of the case.

In operating the sky scanner of FIGS. 15 to 20, if the handle 90 is moved sufficiently far in either direction to move the handle pointer beyond the constellation names Aries or Pisces the light escape aperture 89 in the traveling light cage 78 will register with none of the viewing plates 74 and the center contact terminal 83 of the lamp socket 80 will have left the conductive bus bar 84 and passed onto an end portion of the insulating strip 97 whereby the lamp will be extinguished because of breaking at this point of the battery circuit.

When not in use, all viewing plates 74 will be lowered into the confines of the carrying case 75. When one of the plates is to be used the desired plate can be identified by its tab 74a or by the constellation name on the panel 87 with which the plate aligns. Upon pulling the selected plate upward out of the case it will be held by the yielding engagement of detents 93 in the lower pair of notches 96 in the plate edge and the handle pointer 90 will then be slid along the slot 91 until it registers with the name of the constellation that is aligned with the elevated plate whereupon edge lighting of that plate will take place through the light escape aperture and the chart of diagrams etched on the transparent viewing plate will become faintly visible, but not with sufficient brightness to obscure the actual constellation in the sky from being clearly observed and matched to the diagram on the viewing plate.

All of the several forms of sky scanner which have now been described herein and many departures therefrom and variations thereof will be suggested by this disclosure to workers in the art, wherefore the appended claims are directed to and intended to cover all such departures and variations which come within a broad interpretation of the recital of the claims.

We claim:

1. An instructional sky scanner for aid in locating and identifying celestial bodies while viewing the same in the night sky comprising, a plurality of transparent viewing plates each bearing a constellation diagram illuminable by edge lighting of the plate, manually graspable framework constructed to engage marginal edges of said plates in a manner to support the plates in face-to-face slightly separated parallel relation with one broadside surface of each plate exposed to light from the sky and the opposite broadside surface of each plate exposed to the eyes of an observer of the sky and with edges of said plural plates occupying a common plane, a chamber in said framework to which only said coplanar edges of said plates are exposed, a source of light in said chamber, a light baffling gate in said chamber mounted to be shiftable in relation to each of said plate edges between a position to permit and a position to prevent the passage of light from said source to the edge of a selected one of said plates, a sliding structure mounted for rectilinear movement in said chamber operatively related to said gate to impel the same from one to another of said positions, and at least one handle device operative to actuate said sliding structure within said chamber and accessible from the outside thereof for manual operation.

2. An instructional sky scanner as defined in claim 1, in which the said light baffling gate is mounted to be shiftable in a rectilinear direction parallel with the said common plane of the said plate edges.

3. An instructional sky scanner as defined in claim 1, in which the said sliding structure is mounted to be shiftable to impel the said gate between positions to permit and positions to prevent the passage of light from the said source to the said edge of the said plate.

4. An instructional sky scanner as defined in claim 1, in which the said light baffling gate is mounted to be shiftable in a rectilinear direction between positions to permit and positions to prevent the passage of light from the said source to the edges of a plurality of said plates selectively.

5. An instructional sky scanner as defined in claim 1, in which the said handle device comprises a push button pivotally mounted to swing in the said chamber.

6. An instructional sky scanner as defined in claim 1, in which the said handle device comprises a push button slidably mounted to perform rectilnear movement in the said chamber.

7. An instructional sky scanner as defined in claim 1, in which the said handle device comprises a plurality of push buttons within the said chamber differentially operative on the said sliding structure to impel the same to respectively different distances crosswise of the said coplanar edges of the said viewing plates.

8. An instructional sky scanner as defined in claim 7, in which the said sliding structure comprises a plurality of ears differently positioned to be engaged respectively by the said push buttons.

9. An instructional sky scanner as defined in claim 8, in which the said source of light includes an electric lamp bulb and a battery for energizing the same, and each of the said push buttons is constrained to move substantially an equal distance to a limit position, together with electric switch contacts in electrical series with the said lamp bulb and battery arranged to be actuated and closed for illuminating the said chamber when any one of said push buttons occupies its said limit position.

10. An instructional sky scanner as defined in claim 1, in which there are a plurality of the said light baffling gates and sliding structures each mounted to be shifted individually and independently of the others between a position to permit and a position to prevent the passage of light from said source to the edge of a respectively different viewing plate, and the said handle device includes a plurality of push buttons mounted for individual and independent movement in the said chamber, together with separate motion transmitting connections operatively associating a different one of said gates and sliding structures with a different one of said push buttons.

11. An instructional sky scanner as defined in claim 10, in which each of the said gates compries an opaque light baffling rocking member having a trunnion journaled in the said chamber to be swingable between a position blinding the edge of one of said viewing plates from the said source of light and a position exposing said plate edge to said source of light.

12. An instructional sky scanner as defined in claim 11, in which each of the said trunnions of the said rocking member carries a lug impellingly engageable by a different one of the said sliding structures.

13. An instructional sky scanner as defined in claim 1, in which the said light baffling gate comprises a cage slidably mounted in the said chamber having an opaque wall containing a slot movable with said cage crosswise of the said edges of said viewing plates, said cage containing the said lamp bulb.

14. An instructional sky scanner as defined in claim 13, in which the said cage carries conductive shoes comprising movable circuit terminals of said lamp bulb externally of said cage within said chamber, together with stationary conductive contacts comprising circuit terminals of the said lamp energizing battery positioned to be conductively wiped by said shoes during sliding movement of said cage.

15. An instructional sky scanner as defined in claim 1, in which the said framework comprises a box-like carrying case having side walls approximately coextensive with the broadside dimensions of the said viewing plates and externally flanking the same, and each of the said viewing plates is individually equipped with a tab projecting beyond the edges of the other plates to be individually accessible as a handle for drawing any selected viewing plate out of said carrying case clear of flanking relation to said other plates.

16. An instructional sky scanner as defined in claim 15, in which the said viewing plates contain detent notches in their side edges, together with spring detents carried by the said case positioned to engage with and yieldingly stay said plates in relation to said case when drawn out therefrom.

References Cited in the file of this patent

UNITED STATES PATENTS

| | | |
|---|---|---|
| 1,828,057 | Lunt et al. | Oct. 20, 1931 |
| 1,930,359 | Hilgenberg | Oct. 10, 1933 |
| 2,032,829 | Bartky | Mar. 3, 1936 |
| 2,535,408 | Grace | Dec. 26, 1950 |
| 2,722,762 | Krajian | Nov. 8, 1955 |

FOREIGN PATENTS

| | | |
|---|---|---|
| 397,547 | Great Britain | Aug. 28, 1933 |